(12) United States Patent
Kimball et al.

(10) Patent No.: US 11,336,125 B2
(45) Date of Patent: *May 17, 2022

(54) ANTENNA ARRAY ELEMENT BY ELEMENT POWER TRACKING

(71) Applicant: pSemi Corporation, San Diego, CA (US)

(72) Inventors: Donald Felt Kimball, El Cajon, CA (US); Mark James O'Leary, San Diego, CA (US)

(73) Assignee: pSemi Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/150,645

(22) Filed: Jan. 15, 2021

(65) Prior Publication Data

US 2021/0210987 A1 Jul. 8, 2021

Related U.S. Application Data

(63) Continuation of application No. 16/383,187, filed on Apr. 12, 2019, now Pat. No. 10,897,162.

(51) Int. Cl.
*H01Q 3/24* (2006.01)
*H04B 1/04* (2006.01)
*H01Q 21/00* (2006.01)
*H02J 50/40* (2016.01)

(52) U.S. Cl.
CPC ......... *H02J 50/40* (2016.02); *H01Q 21/0025* (2013.01)

(58) Field of Classification Search
CPC .. H01Q 3/00; H01Q 3/24; H01Q 3/26; H01Q 21/0006; H01Q 21/0025; H01Q 21/00; H04B 1/04; H04B 1/0458; H04B 1/0483; H04B 2001/0416; H04B 2001/0408
See application file for complete search history.

(56) References Cited

U.S. PATENT DOCUMENTS

| | | | |
|---|---|---|---|
| 7,081,851 B1 * | 7/2006 | Lewis | H01Q 21/0087 342/372 |
| 8,836,578 B2 | 9/2014 | Kenington | |
| 9,712,191 B2 * | 7/2017 | Johansson | H04B 1/0483 |
| 10,897,162 B2 | 1/2021 | Kimball et al. | |
| 2011/0148705 A1 | 6/2011 | Kenington | |
| 2014/0248843 A1 * | 9/2014 | Johansson | H04B 1/0483 455/103 |
| 2017/0163217 A1 | 6/2017 | Bonebright | |
| 2019/0089070 A1 | 3/2019 | Zihir | |

(Continued)

OTHER PUBLICATIONS

Jackson, Blane J., Office Action received from the USPTO dated Sep. 20, 2019 for U.S. Appl. No. 16/383,187, 11 pgs.

(Continued)

*Primary Examiner* — Blane J Jackson
(74) *Attorney, Agent, or Firm* — Jaquez Land Greenhaus & McFarland LLP; Alessandro Steinfl, Esq.

(57) ABSTRACT

Methods and devices addressing power tracking of transmission systems using antenna arrays are disclosed. The disclosed teachings may be implemented on a channel element to channel element basis, are adaptive and can be implemented on short time durations such as time slots. Power efficiency can be improved when applying the described methods to the design of systems with antenna arrays.

18 Claims, 9 Drawing Sheets

300C

(56) References Cited

U.S. PATENT DOCUMENTS

2019/0221947 A1\* 7/2019 Zihir .................. H01Q 3/28
2020/0328623 A1 10/2020 Kimball et al.

OTHER PUBLICATIONS

Jackson, Blane J., Notice of Allowance received from the USPTO dated Sep. 16, 2020 for U.S. Appl. No. 16/383,187, 8 pgs.
Kimball, et al., Response filed in the USPTO dated Mar. 18, 2020 for U.S. Appl. No. 16/383,187, 9 pgs.
Kimball, et al., Response filed in the USPTO dated Sep. 1, 2020 for U.S. Appl. No. 16/383,187, 9 pgs.

\* cited by examiner

ANTENNA ARRAY ELEMENT BY ELEMENT POWER TRACKING

CROSS-REFERENCE TO RELATED APPLICATIONS—CLAIM OF PRIORITY

This application is a continuation of, and claims the benefit of priority under 35 USC § 120 of, commonly assigned and co-pending prior U.S. application Ser. No. 16/383,187, filed Apr. 12, 2019, "Antenna Array Element by Element Power Tracking", the disclosure of which is incorporated herein by reference in its entirety.

BACKGROUND

(1) Technical Field

The present disclosure is related to antenna arrays, and more particularly to methods and apparatus for element by element power tracking of antenna array.

(2) Background

In wireless communication systems using electrically or mechanically steerable phased array antennas, the antenna side-lobe interference may cause challenging design issues. By way of example, in the 5G New Radio (NR) standard where time division duplex (TDD) is used, a single frequency shares the channel between transmission and reception, spacing them apart by multiplexing the two signals on a time basis. In such a scenario, the interference of the neighboring antenna or sub-array may be a performance limiting factor. In order to illustrate this issue, reference is made to FIG. 1, wherein a 4×4 spatially multiplexed array of subarrays (10) is shown. User 1 is covered by beam (11) and user 2 is covered by beam (12) with different data at the same time. As shown in FIG. 1, the user 1's interference level equals the side-lobe level, which is the same for each beam. Similar to time domain, and in the case of a rectangular pulse, when applying Fourier transform to spatial domain, it is known that the first side-lobe is only 13 dB down from the main lobe. However, for code rates such as 64 quadrature amplitude modulation (QAM) or higher, the required signal to interference plus noise ratio (SINR) at the digital modem may be 24 dB or higher. In other words, without any type of signal processing, the signal may already be 11 dB below the noise requirement, thus degrading drastically the system performance. In other words, in such a system, the side-lobe needs to be suppressed to allow the 64 QAM and/or greater communication rates to occur.

One of the commonly used methods for reducing the side-lobe levels of a uniform antenna array involves amplitude tapering, in which the excitation amplitudes of the array elements generally decrease with the distance from the center of the array. As a result of tapering, the total transmitted power is reduced. Moreover, in the systems where the maximum output power per element is limited, tapering may reduce the effective isotropic radiated power (EIRP). This is because tapering always comes with the additional cost of broadening of the main lobe and as result, a reduction in gain. A commonly used tapering method is to use the Taylor window which is known to provide a strong side-lobe suppression with a minimum broadening of the main lobe.

As described above, in antenna arrays where tapering is used, the elements closer to the edges often transmit less power compared to the elements closer to the center of the array. The existing designs based on such an approach are often not optimized in terms of power dissipation requirements. More in particular, in most such systems, the power amplifiers (PA) associated with each antenna may be operating as class B or class AB amplifiers where even without having an input signal, a non-negligible amount of power is dissipated, thus decreasing drastically the overall efficiency of the system. The main reason for the low efficiency of existing systems is that, as a result of tapering, the elements closer to the array edges transmit much less power than the maximum power they can effectively handle.

A well-known technique for wireless transmitter power savings is the average power tracking (APT). Such a technique consists of switching to a lower-dissipation bias condition during intervals with sufficient link margin that permit transmitting at a correspondingly lower power level. As an example, when the transmitter is close to the receiver, the link may be power reduced via signaled feedback. APT conventionally operates on the entire transmit signal (i.e. all array elements simultaneously); as a result, and for the reason evoked previously, it is not an efficient scheme. Moreover, APT, as conventionally done, is based on a mobile environment that is inherently slow in power level changes and therefore does not lend itself for implementations over shorter time intervals.

In general, the distortion is higher in an amplifier when the amplifier is driven closer to its saturation point. In other words, in antenna arrays using tapering without APT, the PAs associated with the elements in the middle of the array are near saturation while the PAs associated with antennas closer to the edges of the array transmit effectively much smaller signals. This represents a non-uniform distribution of non-linearity across the elements in the array, and may impose significant challenges when facing the linearization problems while designing wireless systems based on antenna arrays.

In view of the above, wireless systems using phased array antennas and providing better power efficiency over the existing designs are highly desired. Providing more uniform non-linear distortion differences across the power amplifier array is also needed for the sake of design simplicity. The disclosed methods and devices address such needs and provide solution to the above-mentioned problems. As will be described more in detail, the presented methods are adaptive, and inherently faster than existing solutions and can also be implemented over shorter time intervals.

SUMMARY

According to a first aspect of the present disclosure, a method of power tracking in a wireless transmission system with an antenna array is disclosed, comprising: for each array element of the antenna array, providing a corresponding power amplifier to feed the array element; adjusting transmitted power of the power amplifiers according to a one or more dimension spatial window applied across the antenna array, and for each power amplifier, biasing the power amplifier such that a maximum power handled by the power amplifier is substantially equal to or higher than the transmitted power of the power amplifier.

According to a second aspect of the present disclosure, a wireless transmission system is provided, comprising: an antenna array; and a plurality of power amplifiers, each power amplifier of the plurality of the power amplifiers feeding a corresponding antenna of the antenna array; wherein: the plurality of power amplifiers are configured to transmit power according to a one or more dimension spatial window applied across the antenna array; and for each power amplifier of the plurality of power amplifiers, the power amplifier is configured to handle a maximum power which is substantially equal to or larger than a transmitted power of the power amplifier.

Further aspects of the disclosure are provided in the description, drawings and claims of the present application.

DETAILED DESCRIPTION

Description of Concepts and Terminologies Used Throughout the Disclosure

Figure 1:
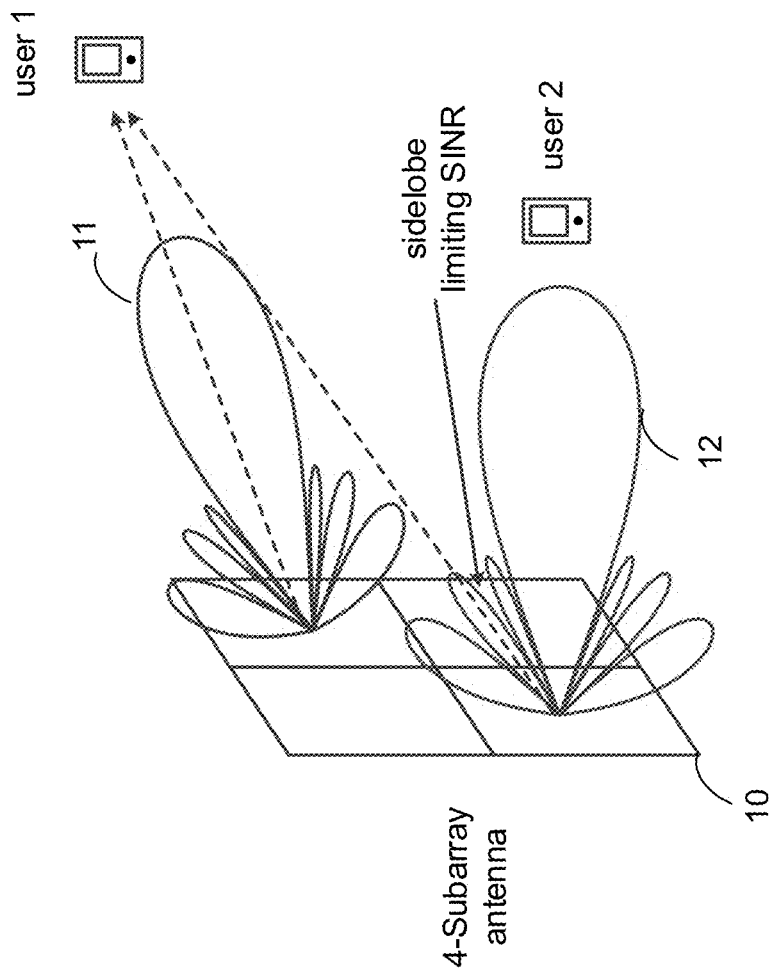
FIG. 1 shows a prior art 4×4 spatially multiplexed subarrays with two users.
Figure 2:
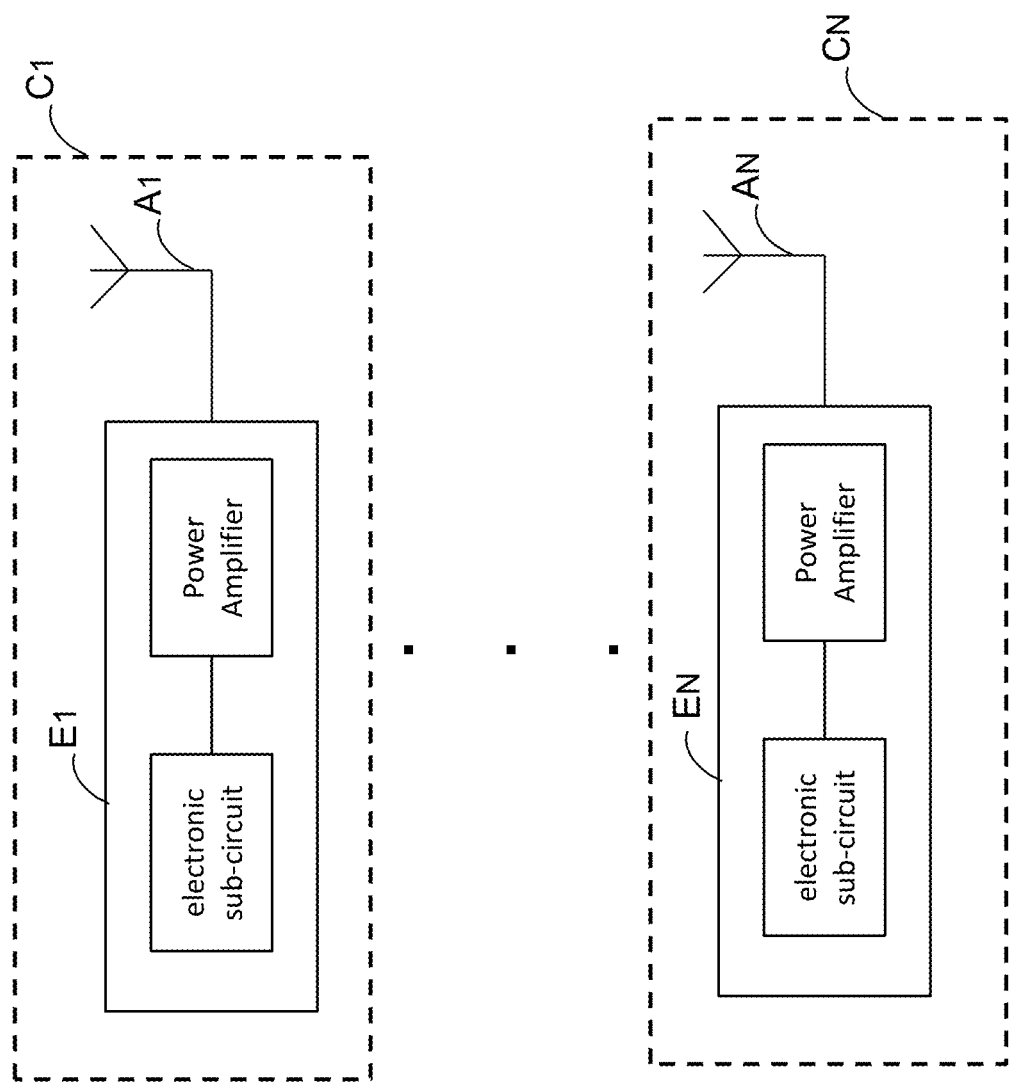
FIG. 2 shows a prior art wireless transmission system.

FIG. 2 shows a wireless transmission system (200). In what follows, based on such generic block diagram some terms used throughout the disclosure will be defined.

Referring back to FIG. 2, the wireless transmission system (200) includes an antenna array consisting of antennas $(A_1, \ldots, A_N)$. The antennas $(A_1, \ldots, A_N)$ have corresponding channel elements $(C_1, \ldots, C_N)$, and each of such channel elements include an electronic circuit (e.g. $E_1, \ldots, E_N$). Moreover, each of the electronic circuits $(E_1, \ldots, E_N)$ comprises an electronic sub-circuit and a power amplifier. Similar to what is shown in FIG. 2, throughout the present disclosure, and in the context of transmission systems using antenna arrays, the term "array element" will be used to describe each individual antennas in the antenna array. In other words, each of the antennas $(A_1, \ldots, A_N)$ is referred to as an array element. The term "channel element" will be used to describe a combination of an "array element" with the corresponding electronic circuit. In other words, and similar to what is shown in FIG. 2, a combination of each of the antennas $(A_1, \ldots, A_N)$ and corresponding sub-circuit and power amplifier is referred to as "channel element".

Throughout the disclosure the term "time slot" will be used to describe the shortest period of time over which a power level is maintained constant. Time slot may lie within the range of 100 usec to 10 nsec.

Throughout the disclosure, the term "power handled" by an amplifier will be used to describe the maximum power that can be transmitted by the amplifier for a specified quiescent bias point and normal operational conditions.

Throughout the disclosure, the term "Taylor window" will be used to describe a window function as described in "mathworks.com/help/signal/ref/taylorwin.html".

Figure 3A:
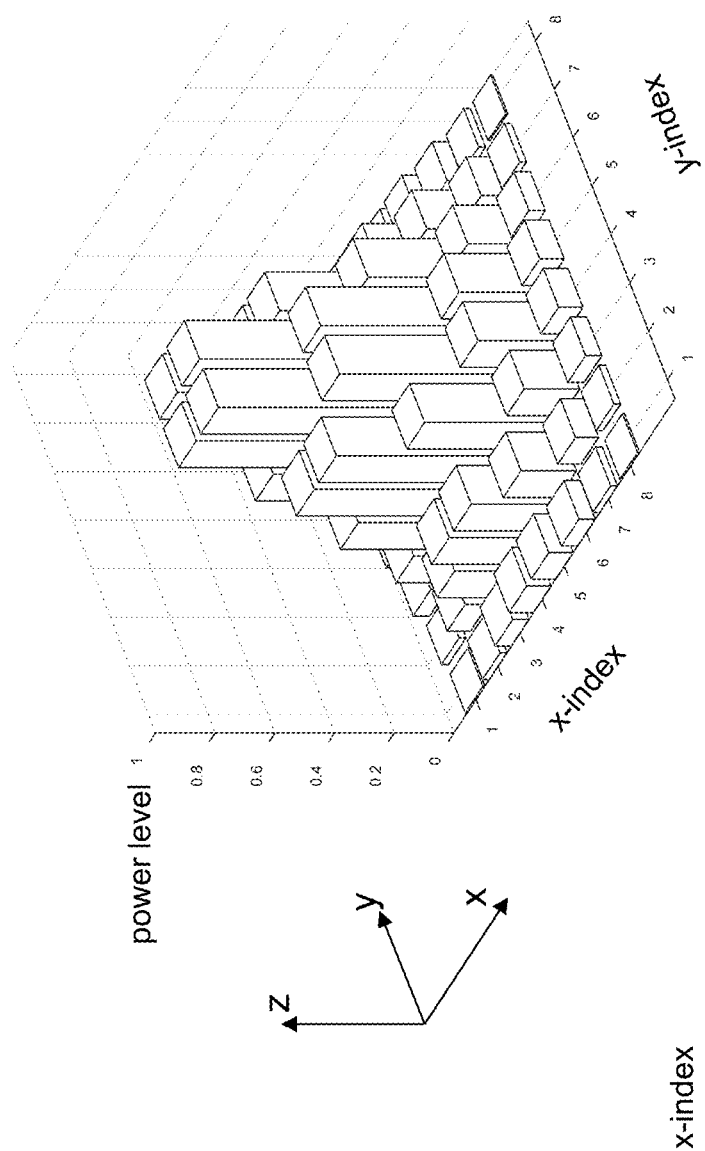
FIG. 3A shows the transmitted power profile across channel elements of an antenna array according to an embodiment of the present disclosure.

FIG. 3A shows a graph (300A) illustrating the distribution profile of the transmitted power across channel elements of an exemplary 8×8 antenna array and in accordance with the embodiments of the present disclosure. The z-axis represents the normalized transmitted power for the PA within each channel element, and the x and y axes represent the (x,y) coordinates of each array element. According to embodiments of the present disclosure, a two-dimensional Taylor window of 16-levels may be applied across both x and y axes to provide the tapering of the transmitted power distribution across the antenna arrays. In accordance with further embodiments of the present disclosure, the Taylor window is a window defined by a set ratio of a main lobe to a first side-lobe in spatial domain. The set ratio may be equal to or larger than 13 dB and in the case shown in FIG. 3A it is targeted for a 24 dB ratio. Other embodiments with a set ratio as large as 40 dB may also be envisaged. As shown in FIG. 3A, the transmitted power corresponding to the central array elements are kept at the maximum power (e.g. unity) while the channel elements closer to the edges of the array transmit less power due to the Taylor window tapering. As an example, channel elements corresponding to array elements with coordinates (8,2) or (7,3) transmit less power than the array element located at coordinates (4,4). According to further embodiments of the disclosure a one or more dimensional spatial window, symmetrical or asymmetrical with respect to x or y axes may also be applied across x or y axes to provide the tapering of the transmitted power distribution across the antenna arrays.

As mentioned previously, in transmission systems using antenna arrays, power efficiency is a crucial factor for which to design. Often times and depending on the standards, power efficiency requirements may be stringent. With further reference to FIG. 3A, and according to teachings of the present disclosure, embodiments may be made wherein the power handling capability of the PA's implemented with the antenna array may be controlled on a channel per channel basis. As an example, and in order to achieve improved power efficiency, the power handling capability of the PA inside each channel element may be set to be substantially equal to or slightly larger than the power to be transmitted at the specific array x-y location. By way of example, the PAs corresponding to the array elements closer to the edges of the array (further from the center of the array) may be biased with a lower voltage and/or current, thus reducing the total power dissipation and the power handling capability. According to further embodiments of the present disclosure, for the 8×8 antenna array with transmitted power profile as shown in FIG. 3A, setting the power handling capability of each power amplifier substantially equal to the transmitted power of the same power amplifier, a 73% power saving may be achieved. This is obtained when a Taylor window with a 30 dB attenuation of the first side-lobe is applied across channel elements of the antenna array. This improvement is essentially achieved over a reference case, wherein all the 64 PAs of the 8×8 array are biased to handle the maximum power transmittable by each PA (e.g. unity as shown in FIG. 3A).

With further reference to FIG. 3A, the person skilled in the art will understand that the 8×8 subarray is an exemplary embodiment to describe the concepts and teachings of the present disclosure. Further embodiments in accordance with the present disclosure may be envisaged, wherein the above-described concept may be applied to an antenna array with any number of antenna and channel elements, and wherein a Taylor window or any other tapering window with an arbitrary number of discrete levels is applied across the channel elements of the antenna array. In Other embodiments according to the present disclosure the weighting in x vs. y direction may be different The person skilled in the art will also appreciate that each PA may be biased to provide a power handling capability which is equal or larger than its transmitted power. In other words, for design simplification purposes, the power handling capability profile across the antenna array may be designed to have a number of levels that may be smaller than the number of power levels associated with the applied tapering window. Continuing with the example of the 16-level Taylor window, a power handling profile with a number of levels smaller than 16 may also be utilized. The smaller the number of levels used in the power handling profile, the simpler the system design will be and such design simplicity comes at the expense of power savings/efficiency. Such design simplicity/power saving tradeoff is further clarified below using more exemplary embodiments in accordance with the present disclosure.

Figure 3B:
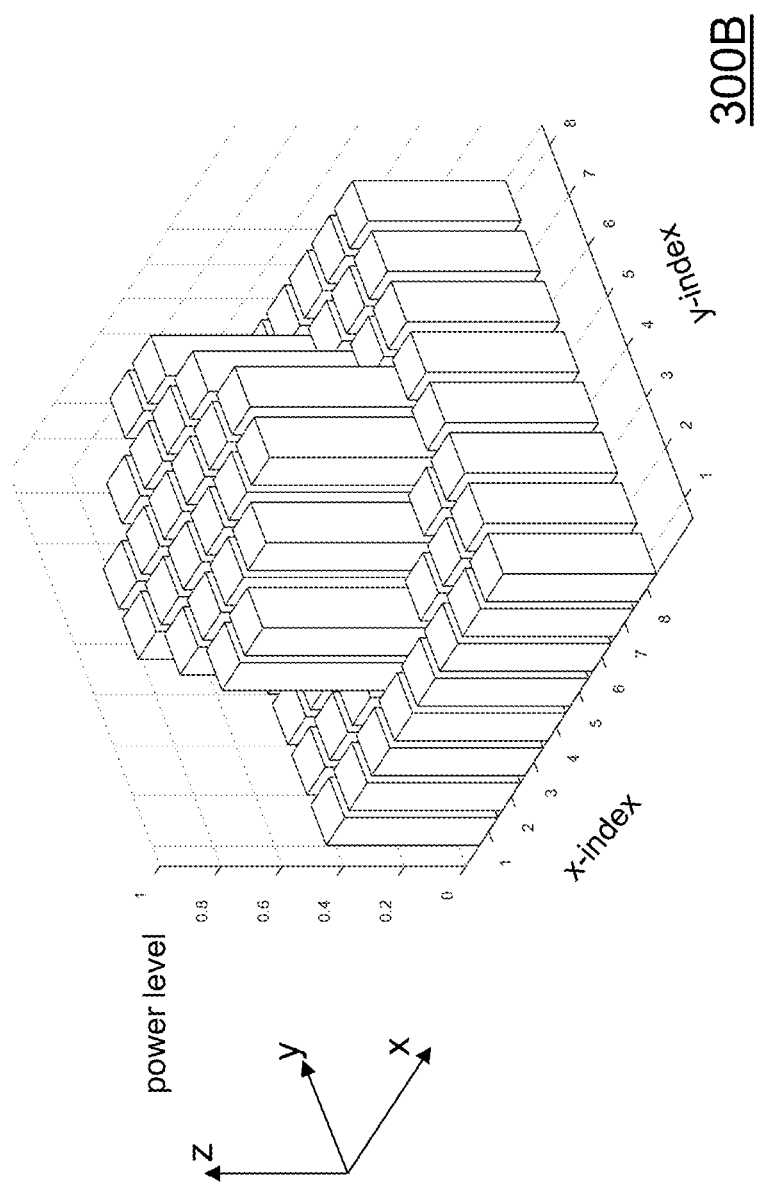
FIGS. 3B-3C show normalized power handling capability profiles across the channel elements associated with an antenna arrays according to embodiments of the present disclosure.

FIG. 3B shows a graph (300B) illustrating the normalized power handling capability profile across the channel elements associated with an exemplary 8×8 antenna array with a transmission power profile as shown in FIG. 3A. In other words, the z-axis represents the maximum power that each power amplifier is configured to handle, and the power is normalized so the maximum is unity corresponding to channel elements at the center of the antenna array. As shown in FIG. 3B, the PAs are biased to have two levels of power handling capability, either 0.5 or 1. Comparing the graphs (300A, 300B), the person skilled in the art will appreciate that the two-level power handling profile has been designed such that each PA has a power handling capability which is larger than its effective transmitted power. As an example, and referring to FIGS. 3A-3B, the PA corresponding to the array element with coordinates (8, 5), has a power handling capability of 0.5 (FIG. 3B) which is larger than its maximum output power 0.25 (FIG. 3A). As a further example, the PA corresponding to the array element with coordinates (5, 4) has a power handling capability of 1 which overs the maximum transmitted power 0.75 of the same PA. According to further embodiments of the present disclosure, the two-level power handling capability profile as shown in FIG. 3B, in conjunction with a Taylor tapering window with 30 dB first side-lobe attenuation, may provide a power savings of 40% compared, again, with the reference case where all the PAs used within the array have the same maximum power handling capability of 1.

Typical wireless transmission systems with antenna arrays may use at least two power supplies which are run across various electronic circuits within each channel element. More in particular, in a TDD scheme, as imposed by the 5G NR radio standard, it is known that at any given instant, each channel element is either in the transmit or in a receive mode. In other words, each channel may use a separate power supply while operating in either transmit or receive mode. This means that the two power supplies can be reused to implement the two-level power handling capability as demonstrated in FIG. 3B. This results in a significant simplification in system design by reusing the already existing resources while improving the power dissipation and therefore the overall system performance. According to embodiments of the present disclosure, the power handling levels as described with regards to FIGS. 3A-3B may be adjustable based on the operational conditions. As an example, in a wireless transmission system involving users driving in a freeway and during busy traffic hours, each PA can be setup with a bias voltage and/or current level which may be very different from the bias voltage and/or current level at which the same PA is setup during a less busy traffic hours. According to further embodiments of the present disclosure, the power handling capability can be dynamically adjusted based on the operational conditions (e.g. capacity requirements of the network) and on a slot by slot basis. In accordance with yet other embodiments of the present disclosure, the power handling capability profile may be dynamically adjusted internally within the user handset using a feedback signal for example, or based on input received from the base station covering same user.

Figure 3C:
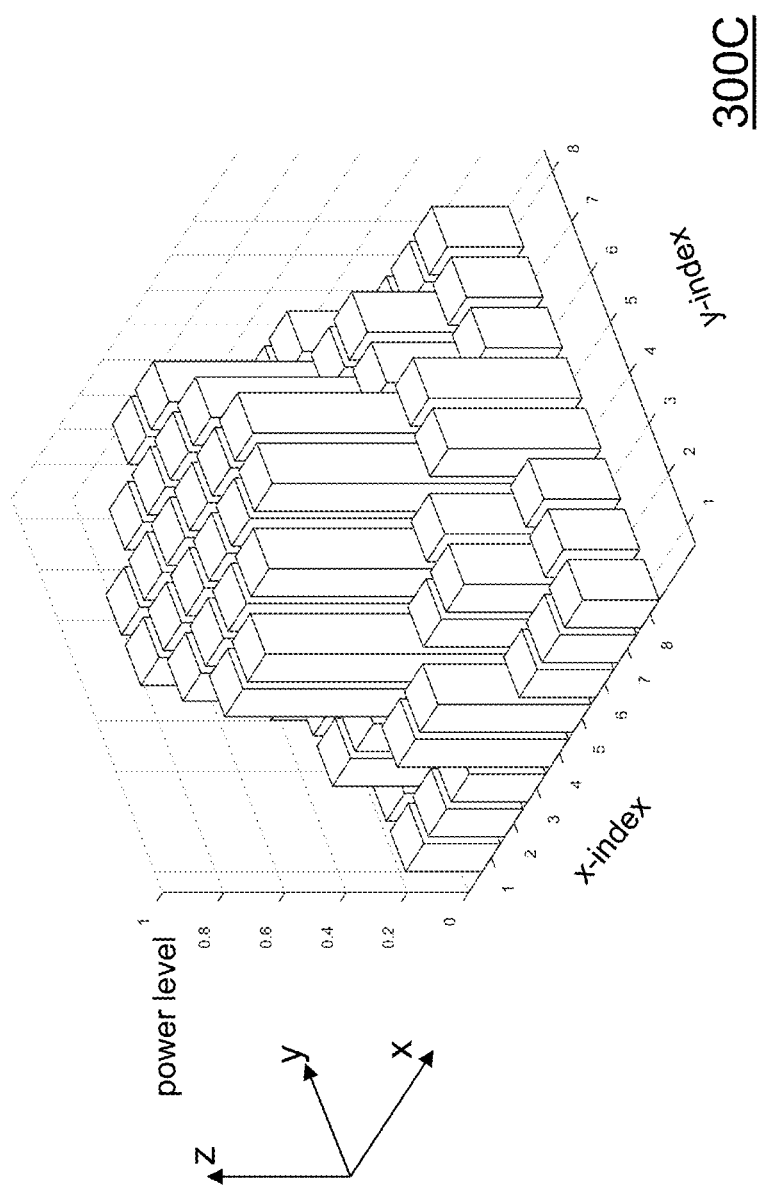

As described previously, the granularity of the power levels associated with the power handling capability profile of the PAs implemented with an antenna array, may vary depending on the power efficiency/design simplicity tradeoff. FIG. 3C shows a graph (300C) illustrating the normalized power handling capability profile across the channel elements associated with an 8×8 antenna array with a transmission power profile as shown in FIG. 3A. As shown in FIG. 3C, the PAs are biased to have three levels of power handling capability, e.g. 0.25, 0.5, or 1. Similar to what was described with regards to the graph (300B) of FIG. 3B, and comparing the graphs (300A, 300C), the three-level power level handling profile has been designed such that each PA has a power handling capability which is larger than or equal to its effective transmitted power. According to embodiments of the present disclosure, the three-level power handling capability profile as shown in FIG. 3C, in conjunction with a Taylor tapering window with 30 dB first side-lobe attenuation, may provide a power savings of 56% compared with the reference case where all the PAs used within the array have the same maximum power handling capability of 1. With further reference to FIGS. 3A-3C, embodiments in accordance with the teachings of the disclosure may be envisaged wherein at least one PA has a bias point which is different from bias points of all other PA's.

As a further exemplary use case wherein the teachings of the present disclosure are applicable, a transmission system using an antenna array divided into a plurality of antenna sub-arrays is considered. The person skilled in the art will understand that, the teachings as disclosed with regards to FIGS. 3A-3B, may also be applied each of the sub-arrays of such antenna array. Moreover, embodiments in accordance with the present disclosure may be envisaged wherein each of the sub-arrays, compared to other antenna sub-arrays, may be designed using a different power handling capability profile and/or a different transmitted power profile and/or a different tapering window, and/or a different granularity of power levels associated with both the transmitted power and the power handling capability profiles. The teachings of the present disclosure can also be applied to transmission systems using Doherty amplifiers as part of the design.

Figure 6:
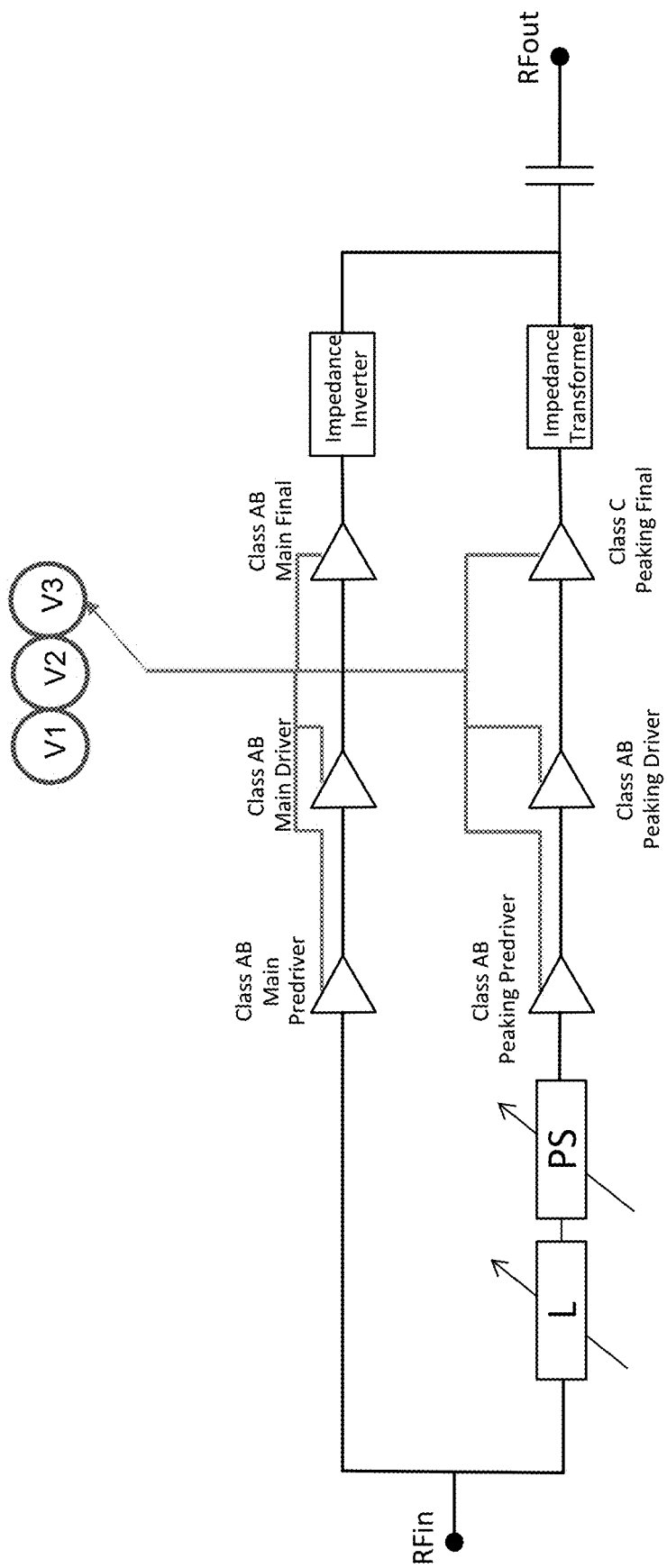
FIG. 6 shows a three stage Doherty amplifier wherein the teachings of the present disclosure are applied.

Another exemplary use case of the teaching of the present disclosure are systems using Doherty amplifiers. FIG. 6 shows a three stage Doherty amplifier wherein the teachings of the present disclosure are applicable. Amplitude and phase alignment are critical in Doherty power amplifiers. The peaking amplifiers are shown in the bottom path and the main amplifiers are shown in the top path. The peaking amplifier turn-on threshold is essential for linearity & efficiency. In order to maintain efficiency and linearity with array power tapering, element by element power tracking is an effective solution. Amplitude and phase alignment change with power supply bias voltage, so a variable amplitude attenuator (L) and an adjustable phase shifter (PS) are adjusted at each voltage tap level. This scheme maintains maximum efficiency and adequate linearity. This added control circuit to the Doherty power amplifier achieves compatibility with element by element average power tracking.

Figure 4:
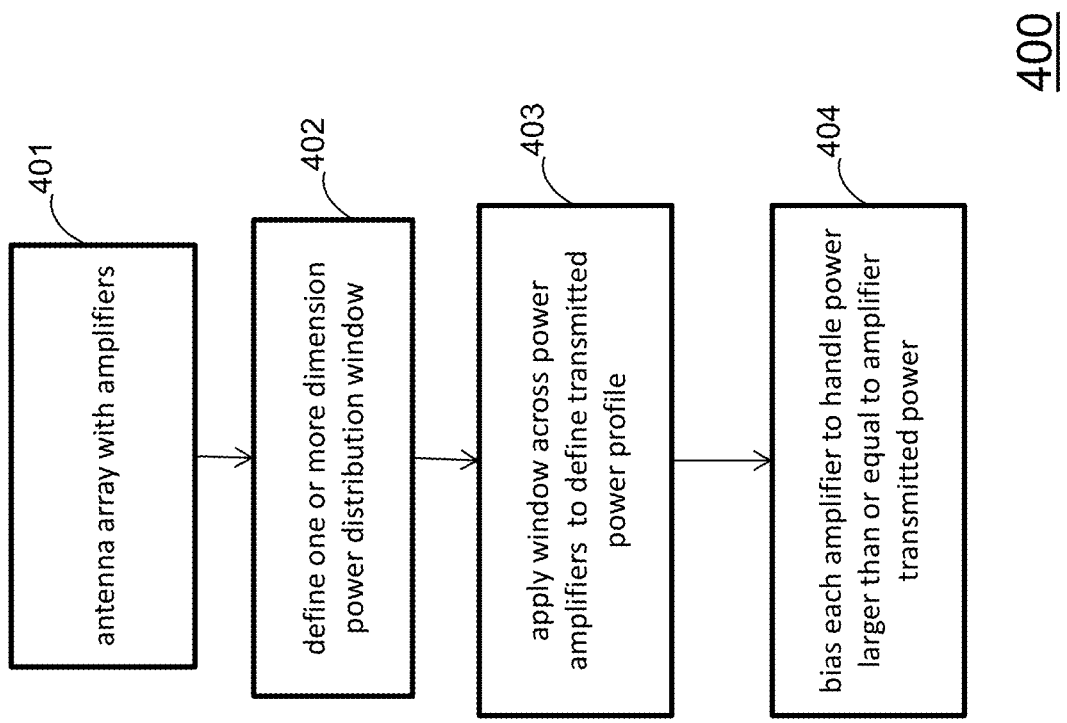
FIG. 4 shows a flowchart illustrating the teachings of the present disclosure.

FIG. 4 shows a flowchart (400) illustrating a power tracking method in accordance with embodiments of the present disclosure. An antenna array with associated power amplifiers is considered, step (401). A one or more dimension power distribution window such as a Taylor window may be defined, step (402). In a further step (403), the window is applied across the antenna array, thus setting up a transmit power profile across power amplifiers. In step (403), each of the amplifiers in the array is biased to handle a maximum power larger than or equal to the transmitted power of the amplifiers. Such biasing scheme may be performed based on an N-level power profile wherein N is an integer smaller or equal to the number of power amplifiers.

Figure 5A:
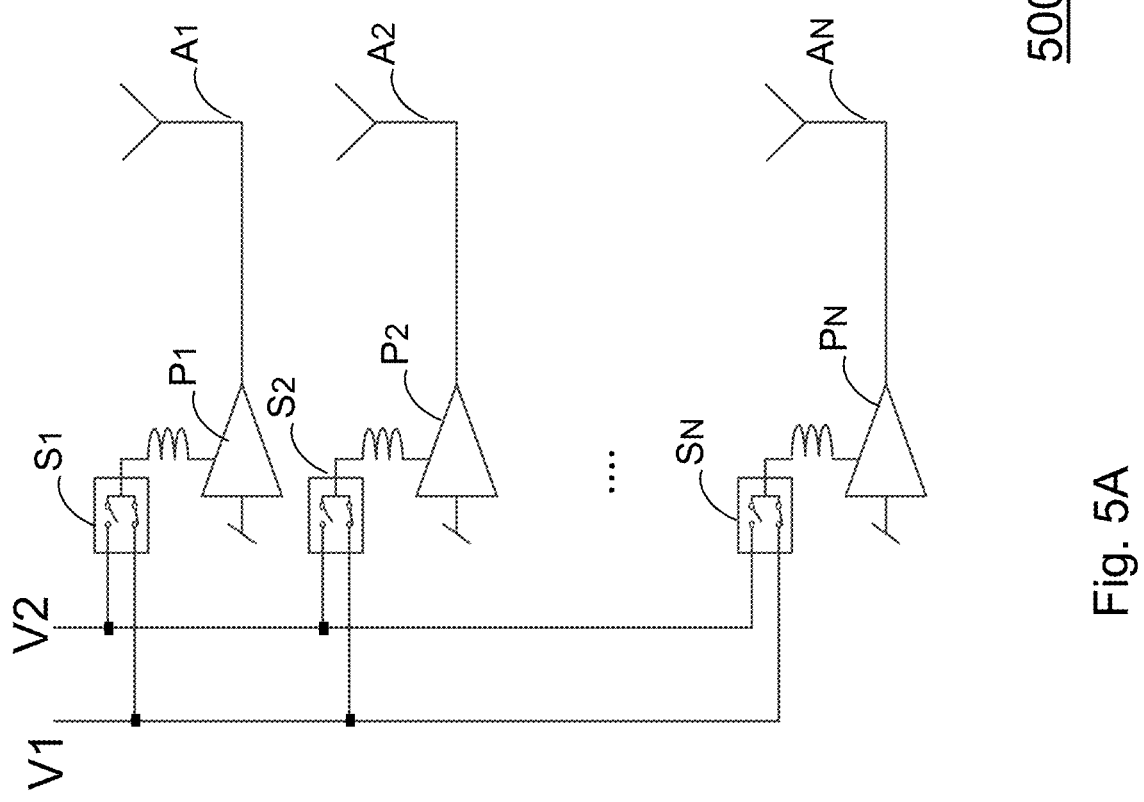
FIGS. 5A-5B show power amplifiers feeding an antenna array and biased in accordance with the teachings of the present disclosure.

FIG. 5A shows a transmission system (500A) according to an embodiment of the present disclosure. The transmission system (500A) comprises an antenna array having a plurality of antennas (A1, . . . , AN) and a plurality of power amplifiers (P1, . . . PN) feeding the antenna array. Similar to what was described with regards to FIGS. 3A-3B, the transmitted power profile associated with the power amplifiers (P1, . . . PN) may follow a set profile. Moreover, and as also shown in FIG. 5A, the power amplifiers (P1, . . . PN) are configured so that they may be biased using two bias voltages (V1, V2). In other words the power handling profile associated with the amplifiers (P1, . . . PN) is a two-level power profile as defined by the two bias voltages (V1, V2). According to further embodiments of the present disclosure, bias voltages (V1, V2) are designed such that the maximum power handled by each of the power amplifiers of the plurality of power amplifiers (P1, . . . PN) is larger than or equal to the transmitted power of the same power amplifier. The transmission system (500A) further comprises a plurality of switch blocks (S1, . . . , SN), each including two switches corresponding to the bias voltages (V1, V2). Depending on the operational condition and states of the two switches inside each switch clock (S1, . . . , SN) each of the power amplifiers (P1, . . . PN) may be biased through one of the bias voltages (V1, V2). In some embodiments according to the present disclosure, states of switches in each switch block may be controlled by a control interface that map the power weighting window/profile to the individual power amplifiers in the array.

Figure 5B:
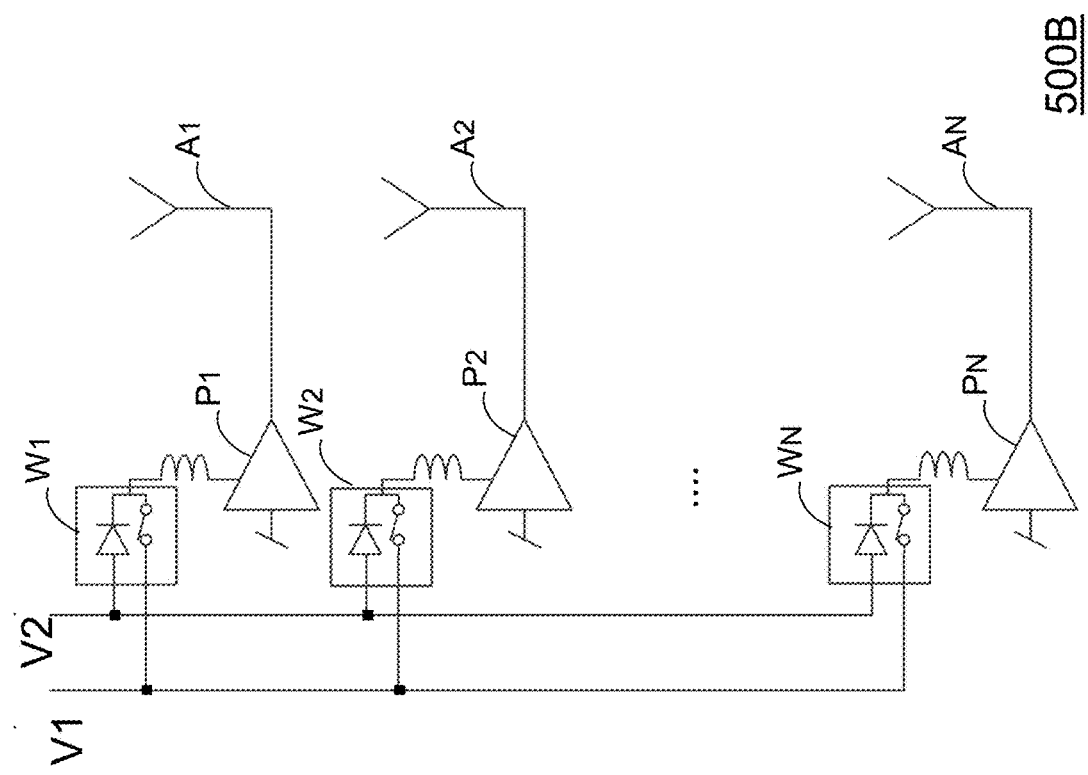

FIG. 5B shows a transmission system (500B) according to another embodiment of the present disclosure. The principle of operation of the transmission system (500B) is similar to what has been described with regards to the transmission system (500A) of FIG. 5A, except that switch blocks (W1, . . . , WN) are different from the switch boxes (S1, . . . , SN) of FIG. 5A. Each switch block Wi includes a diode and a switch. When the switch is closed, the corresponding diode is reverse biased and the power amplifiers (P1, . . . , PN) are biased using the bias voltage V1. On the other hand, when the switch inside each of the switch blocks (W1, . . . , WN) is open, the corresponding diode is conducting and as a result, the power amplifiers (P1, . . . , PN) are biased through the bias voltage (V2). According to embodiments of the present disclosure, the bias voltage (V1) is larger than the bias voltage (V2). In further embodiments according to the present disclosure, states of switches in each switch block may be controlled by a control interface that map the power weighting window/profile to the individual power amplifiers in the array.

The term "MOSFET", as used in this disclosure, means any field effect transistor (FET) with an insulated gate and comprising a metal or metal-like, insulator, and semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As should be readily apparent to one of ordinary skill in the art, various embodiments of the invention can be implemented to meet a wide variety of specifications. Unless otherwise noted above, selection of suitable component values is a matter of design choice and various embodiments of the invention may be implemented in any suitable IC technology (including but not limited to MOSFET structures), or in hybrid or discrete circuit forms. Integrated circuit embodiments may be fabricated using any suitable substrates and processes, including but not limited to standard bulk silicon, silicon-on-insulator (SOI), and silicon-on-sapphire (SOS). Unless otherwise noted above, the invention may be implemented in other transistor technologies such as bipolar, GaAs HBT, GaN HEMT, GaAs pHEMT, and MESFET technologies. However, the inventive concepts described above are particularly useful with an SOI-based fabrication process (including SOS), and with fabrication processes having similar characteristics. Fabrication in CMOS on SOI or SOS processes enables circuits with low power consumption, the ability to withstand high power signals during operation due to FET stacking, good linearity, and high frequency operation (i.e., radio frequencies up to and exceeding 100 GHz). Monolithic IC implementation is particularly useful since parasitic capacitances generally can be kept low (or at a minimum, kept uniform across all units, permitting them to be compensated) by careful design.

Voltage levels may be adjusted or voltage and/or logic signal polarities reversed depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functional without significantly altering the functionality of the disclosed circuits.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, or parallel fashion.

It is to be understood that the foregoing description is intended to illustrate and not to limit the scope of the invention, which is defined by the scope of the following claims, and that other embodiments are within the scope of the claims. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

What is claimed is:

1. A method of power tracking in a wireless transmission system with an antenna array comprising:

for each array element of the antenna array, providing a corresponding power amplifier to feed the array element, each power amplifier connected to two separate supply voltages to implement a power-level handling capability with two power levels;

for each power amplifier providing a switch configured to either i) connect the power amplifier with a first supply voltage of the two supply voltages and correspondingly disconnect the power amplifier from a second supply voltage of the two supply voltages or ii) disconnect the power amplifier from the first supply voltage and correspondingly connect the power amplifier with the second supply voltage;

adjusting transmitted power of the power amplifiers according to a spatially-based amplitude tapering of the antenna array based on a location of each antenna element of the antenna array; and for each power amplifier, supplying the power amplifier with the first supply voltage or the second supply voltage by correspondingly closing or opening the switch provided with the power amplifier, such that a maximum power handled by the power amplifier is substantially equal to or higher than the transmitted power of the power amplifier.

2. The method of claim 1, wherein the supplying the power amplifier is such that at least one power amplifier has a bias point different from bias points of all other power amplifiers.

3. The method of claim 1, wherein, for each power amplifier:

supplying the power amplifier with the first supply voltage comprises providing the power amplifier with a first level of maximum power handled by the power amplifier;

supplying the power amplifier with the second supply voltage comprises providing the power amplifier with a second level of maximum power handled by the power amplifier; and selection between the first supply voltage and the second supply voltage occurs by comparing an adjusted transmitted power level of the power amplifier with the first level of maximum power and the second level of maximum power of the power amplifier and selecting the lowest level among the first level and the second level that is at least equal to the adjusted transmitted power level.

4. The method of claim 2, wherein the amplitude tapering has a tapering configuration with a maximum in a center of the antenna array and tapering away from the center of the antenna array.

5. The method of claim 4, wherein the tapering configuration is symmetrical in one or more dimensions with respect to the center of the antenna array.

6. The method of claim 5, wherein the tapering configuration occurs in one or more spatial dimensions according to a Taylor window with a set ratio of a main lobe to a first side-lobe in spatial domain.

7. The method of claim 1, wherein the antenna array comprises N2 array elements arranged as an N×N array, N being an integer equal to at least 2.

8. The method of claim 2, wherein:

the antenna array is divided into a plurality of sub-arrays; and the method is applied to each sub-array of the plurality of the sub-arrays.

9. The method of claim 2, wherein the supplying the power amplifier is dynamically performed in a range of 100 us to 10 ns and in correspondence with set operational conditions.

10. The method of claim 2, wherein the maximum power handled by the power amplifier is selected from 'n' different power levels, wherein 'n' is an integer larger or equal to 2 and smaller than or equal to a number of array elements of the antenna array.

11. A wireless transmission system comprising:

an antenna array;

a plurality of power amplifiers, each power amplifier of the plurality of the power amplifiers feeding a corresponding antenna of the antenna array; and a plurality of switch blocks connected to the plurality of power amplifiers, each switch block comprising a plurality of switches to switchably and independently connect a given power amplifier to one of two or more separate supply voltages to implement a power-level handling capability with two or more power levels, wherein:

the plurality of power amplifiers are configured to transmit power according to a spatially-based amplitude tapering of the antenna array based on a location of each antenna element of the antenna array;

when a first switch of the plurality of switches for the given power amplifier is closed and all other switches are open, a corresponding amplifier of the plurality of amplifiers is configured to receive a first supply voltage such that a maximum power handled by the amplifier of the plurality of amplifiers is substantially equal to or larger than a first transmitted power of the power amplifier; and when a second switch of the plurality of switches for the given amplifier is closed and all other switches are open, the amplifier of the plurality of amplifiers is configured to receive a second supply voltage such that the maximum power handled by the amplifier of the plurality of amplifiers is substantially equal to or larger than a second transmitted power of the power.

12. The wireless transmission system of claim 11, wherein the plurality of power amplifiers are configured such that a bias points of at least one power amplifier of the plurality of power amplifiers is different from bias points of all other power amplifiers of the plurality of power amplifiers.

13. The wireless transmission system of claim 11, wherein the amplitude tapering has a tapering configuration with a maximum in a center of the antenna array and tapering away from the center of the antenna array.

14. The wireless transmission system of claim 11, wherein the one of the two or more supply voltages for the given power amplifier depends on a tapering configuration of transmit power of the given power amplifier according to one or more spatial dimensions applied across the antenna array.

15. The wireless transmission system of claim 14, wherein the tapering configuration is symmetrical in one or more dimensions with respect to the center of the antenna array.

16. The wireless transmission system of claim 15, wherein the spatially-based amplitude tapering configuration occurs according to a Taylor window defined by a set ratio of a main lobe to a first side-lobe in spatial domain.

17. The wireless transmission system of claim 14, wherein the maximum power handled by the power amplifier is selected from 'n' different power levels, wherein 'n' is an integer larger or equal to 2 and smaller than or equal to a number of array elements of the antenna array.

18. A wireless transmission system comprising:
an antenna array;
a plurality of power amplifiers, each power amplifier of the plurality of the power amplifiers feeding a corresponding antenna of the antenna array; and
a plurality of switch blocks connected with the plurality of power amplifiers, each switching block comprising a switch,
wherein:
when the switch is in a first state, each power amplifier of the plurality of amplifiers is configured to receive a first supply voltage;
when the switch is in a second state, each amplifier of the plurality is configured to be connected to a second supply voltage separate from the first supply voltage, to implement a power-level handling capability with two power levels; and
the first voltage is smaller than the second voltage,
wherein, for each power amplifier:
receiving the first supply voltage comprises providing the power amplifier with a first level of maximum power handled by the power amplifier when the switch is in the first state;
receiving the second supply voltage comprises providing the power amplifier with a second level of maximum power handled by the power amplifier when the switch is in the second state; and
selective reception of the first supply voltage or the second supply voltage occurs by comparing an adjusted transmitted power level of the power amplifier with the first level of maximum power and the second level of maximum power of the power amplifier and selecting the lowest level among the first level and the second level that is at least equal to the adjusted transmitted power level.

* * * * *